W. E. ARMISTEAD.
APPARATUS FOR MAKING ICE.
APPLICATION FILED DEC. 20, 1917.

1,390,863.

Patented Sept. 13, 1921.

W. E. ARMISTEAD.
APPARATUS FOR MAKING ICE.
APPLICATION FILED DEC. 20, 1917.

1,390,863. Patented Sept. 13, 1921.
3 SHEETS—SHEET 3.

Witness
Edwin J. Beller.

Inventor
W. E. Armistead.
by Wilkinson & Giusta,
Attorneys.

UNITED STATES PATENT OFFICE.

WILLIAM E. ARMISTEAD, OF LAGRANGE, GEORGIA.

APPARATUS FOR MAKING ICE.

1,390,863. Specification of Letters Patent. Patented Sept. 13, 1921.

Application filed December 20, 1917. Serial No. 208,116.

*To all whom it may concern:*

Be it known that I, WILLIAM E. ARMISTEAD, a citizen of the United States, residing at Lagrange, in the county of Troup and State of Georgia, have invented certain new and useful Improvements in Apparatus for Making Ice; and I do hereby declare the following to be a full, clear, and exact description of the invention, such as will enable others skilled in the art to which it appertains to make and use the same.

My invention relates to improvements in apparatus for the manufacture of ice from the direct expansion of a refrigerant, and is especially applicable to the manufacture of ice from raw water.

My invention will be more fully understood after a brief reference to the various accepted methods now in use, or purposed to be used in the manufacture of artificial ice.

At present there are several accepted methods of producing artificial ice, those most generally used being the distilled water can system, the plate system and the raw water can system, each of which has many minor differences in application of its special method.

In the distilled water can system, the almost universal practice is to use a large freezing tank filled with suitable brine and into which the cans containing the water to be frozen are placed, the brine being cooled with a suitable refrigerant expanded into pipe coils placed in the brine, and spaced between the cans containing the water to be frozen; or the brine is cooled by being circulated through brine coolers and then circulated around the cans in the tank.

In the raw water systems, much the same procedure is followed, except that instead of distilled water being used, raw water is employed and air is injected into the freezing cans to agitate the water during freezing and thus carry off entrained air and produce clear ice.

In some of the raw water apparatus the air for agitation is introduced through pipes dropped into removable cans, and when the ice cake is nearly solid the air pipe is withdrawn; in others the air pipe is fixed in the can, the air introduced from top and discharged into the ice can at the center and bottom of can.

In the two preceding systems the water, when frozen nearly to the center of the forming cake of ice, is charged with all the impurities thrown from that portion congealed, and to prevent freezing such impurities into the cake of ice, the unfrozen center is pumped out and the small central cavity is re-filled with either distilled or well filtered water and the freezing is then completed.

Such apparatus requires constant attention and involves much unnecessary work, and care, and even then is hard to keep in operation.

To overcome the many disadvantages of the so called drop pipe raw water systems has been the endeavor of many engineers and inventors, and they have designed and placed in operation plants having fixed cans and injected air for agitation into the fixed cans through suitable connections through the bottom of the brine tank, and into the freezing can, and then harvest the ice by the use of pulling hooks or eye-bolts frozen into the cake of ice.

In the "fixed can" system many methods of thawing the ice from the cans are employed, but in nearly all of them the results are quite unsatisfactory, and thawing is really accomplished by allowing the temperature of the surrounding brine to rise by absorbing the atmospheric heat, or heating the brine, or by circulating warmer brine into the brine tank and around the cans containing the ice to be harvested.

In all of these "can systems" heat is extracted from the water to be congealed by the use of cold brine circulated around the cans, which necessitates an enormous amount of brine and suitable brine producing materials, expansion coils in brine tanks or brine coolers, brine agitation machinery, brine tanks, controlling headers, etc., and entails the expenditure of much power; while at the same time much heat is absorbed by the brine through the tank walls, cans, etc., and generated by friction.

To overcome the expense of the brine systems, many devices have been tried, and the only one having a measure of success is the well known plate system, which employs suitable metal plates with pipe coils therein, or in some instances baffles into which the desired refrigerant is directly expanded and the ice formed on the face of the plates to the desired thickness from one direction only.

In practice, the direct expansion plate systems have been found cumbersome, expensive of upkeep, and liable to constant interruption by break-down, caused by excessive expansion and contraction of large plates, in addition to the almost prohibitive cost of installation, the trouble of harvesting, and the excessive space required to obtain a given output.

To overcome the many disadvantages and the expense of manufacture in other systems, by doing away with the necessity of using brine and brine tanks, dispensing with distilled water and necessary distilling apparatus, and producing pure, clear, commercial ice from raw water in suitable size cakes, and employing direct expansion of the refrigerant, is the purpose of my invention, hereinafter described.

While especially designed as a direct expansion system, it may be also used when desired with brine, or other refrigerating media.

My invention will be more fully understood by reference to the accompanying drawings, in which.

Each freezing unit is held in a rectangular trough A, having vertical side walls $a$ and $a'$ and a flat bottom $a^2$, the ends of each unit being closed by double plate partitions D which constitute the expansion chambers in which the expansible refrigerant is admitted.

There are a series of these double plate partitions or expansion chambers, which separate each freezing unit into a series of freezing compartments B, in which the ice is formed, as will be hereinafter described.

Figure 3:
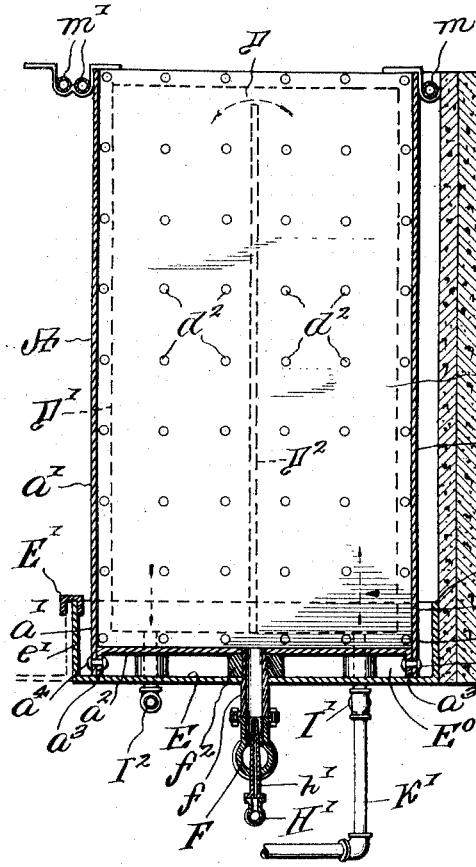
Fig. 3 shows a section through one of the freezing units shown in Figs. 1 and 2, the section being along the line 3—3 of Fig. 2, and looking in the direction of the arrows.
Figure 4:
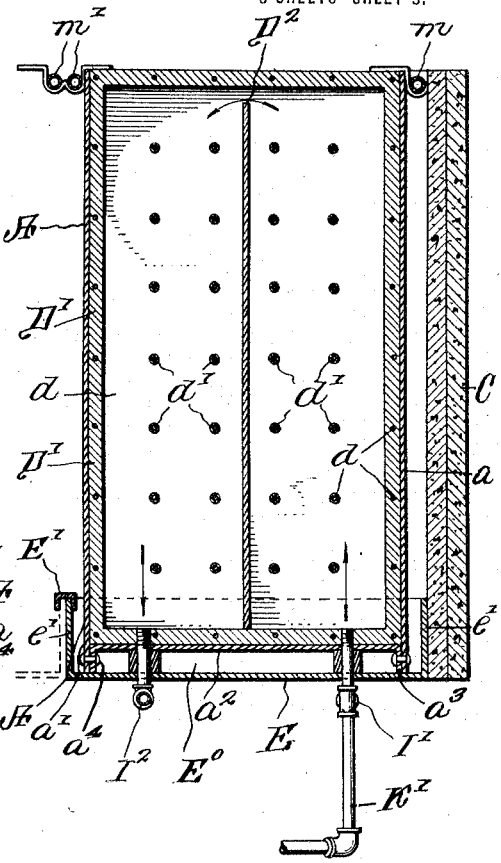
Fig. 4 shows a similar section to Fig. 3, but taken along the line 4—4 of Fig. 2.
Figure 5:
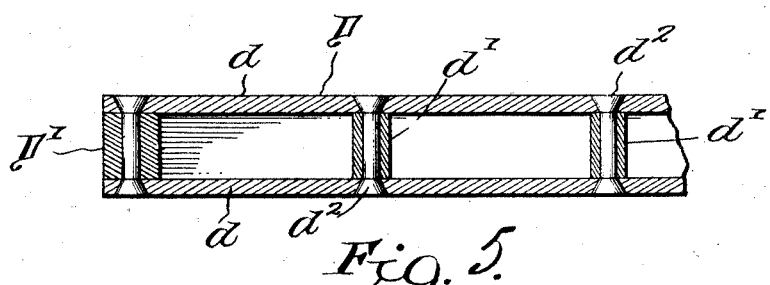
Fig. 5 shows a section through one of the expansion chambers, as taken along the line 5—5 of Fig. 2, but showing the parts on a larger scale.

Each of these expansion chambers is firmly secured to the bottom and side walls of the trough A so as to form a water-tight joint therewith. These expansion chambers are provided with side walls in the form of plates $d$ which are spaced apart all around their periphery by the frames D', and also by the thimbles $d'$, see Fig. 5, and are secured together to stand the pressure of the gas therein by means of the countersunk bolts or rivets $d^2$. Each of these expansion chambers is provided with a baffle plate $D^2$ which projects nearly up to the top of the same, as shown in Figs. 3 and 4, and thus permits the gas admitted to the bottom of the chamber at one side of the said baffle plate to flow upward and, passing above the same, to be drawn off at the bottom of the said chamber upon the opposite side of said baffle plate.

A suitable cover is provided for each freezing unit, but this cover is omitted from the drawings for the sake of clearness.

Figure 1:
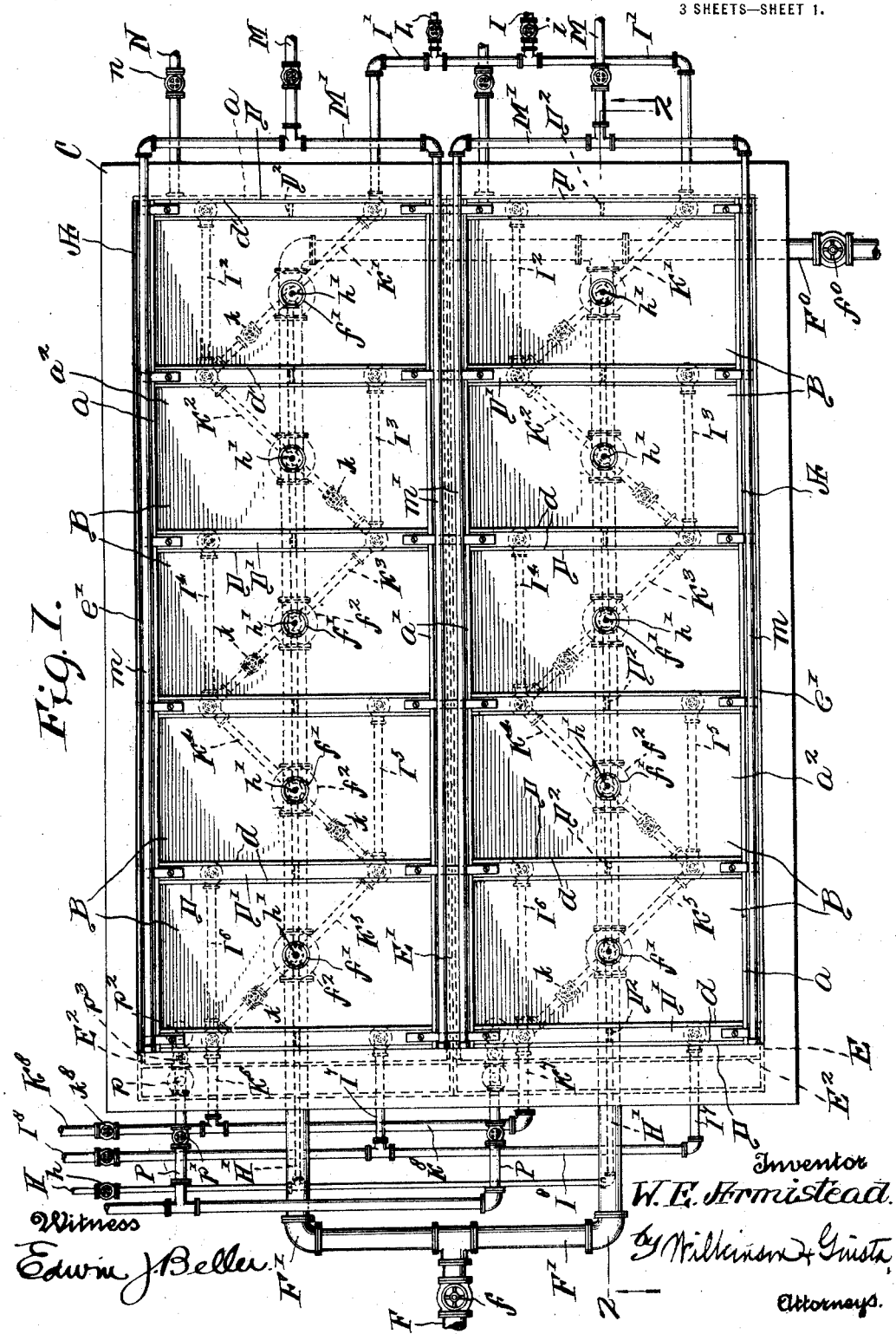
Figure 1 shows a plan view of two sets of refrigerating units, with the pipe connections, the compressors and means for supplying refrigerating gas, and other parts of the plant being omitted for the sake of clearness in the drawings.

I have shown in Fig. 1 two of these freezing units each divided up into five freezing compartments. Thus the apparatus shown in Fig. 1 is capable of making ten blocks of ice at a time, but it will be obvious that the number of these freezing units may be multiplied indefinitely, if desired.

Surrounding each series of freezing units there is suitable insulating material, such as the double layer of cork board C.

The bottom $a^2$ of the trough A has its ends $a^3$ flanged downward, as shown in Figs. 3 and 4, and secured to the vertical side walls $a$ and $a'$ by means of the bolts or rivets $a^4$, thus serving to space the bottom $a^2$ of the trough above the thaw pan E which projects beyond the sides $a$ and $a'$ as shown in Figs. 3 and 4, the sides $e'$ and ends of this thaw pan are higher than the bottom $a^2$ of the trough A. The adjacent thaw pans in the series are connected together by the inverted trough-shaped strips E', which serve not only to couple the adjacent thaw pans together, but also to prevent the thawing water from dripping down the sides of the pan, as will be hereinafter described, and from passing in the space between the pans.

It will be seen that the bottom of the thaw pan and the bottom of the trough A, being spaced apart, provide a chamber E° for the thaw water to enter and flow beneath the bottom of the freezing compartments.

Figure 2:
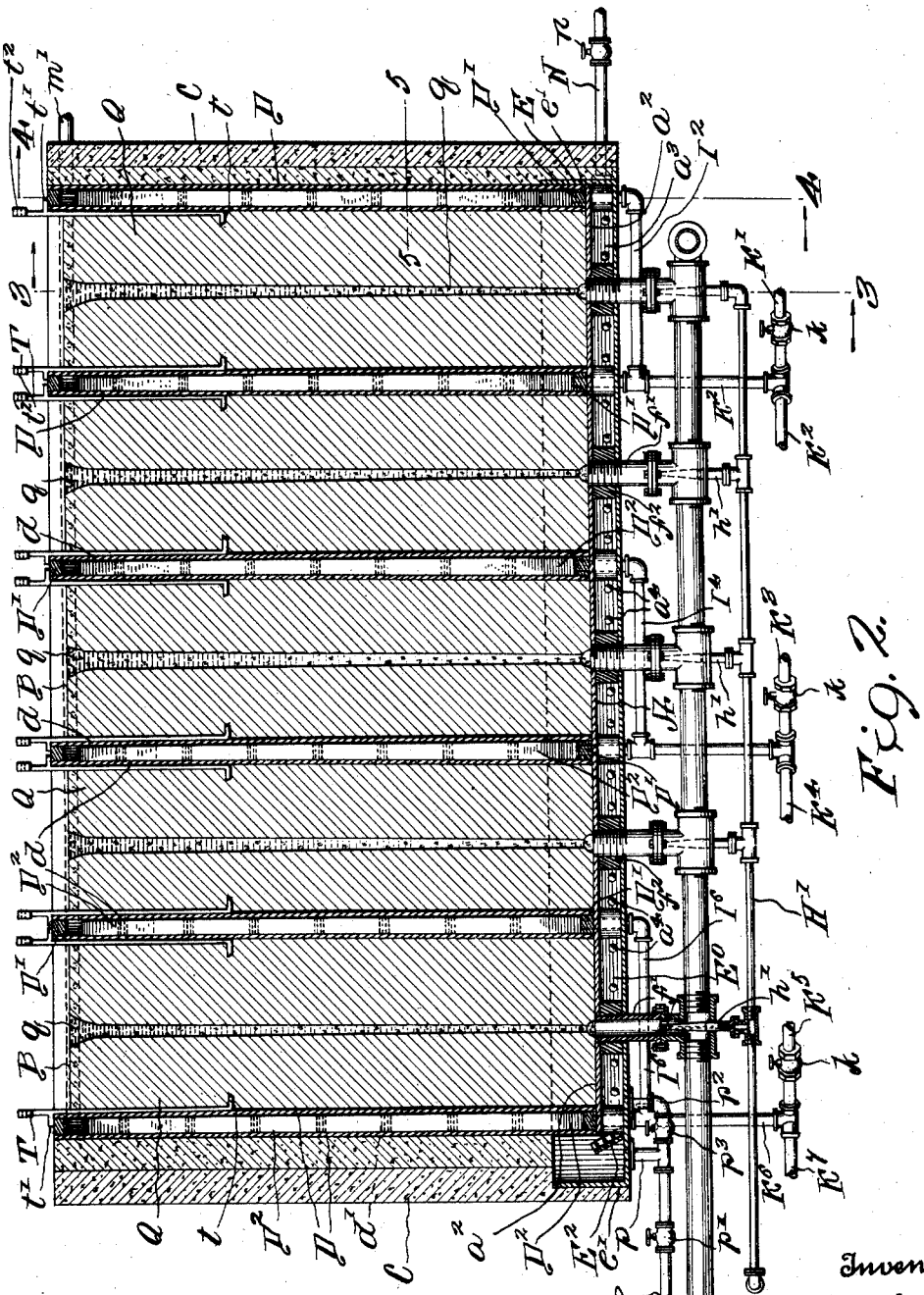
Fig. 2 shows a section along the line 2—2 of Fig. 1, and looking in the direction of the arrows.

In order to cause the water to rise to the level of the bottom $a^2$ of the freeizng unit, I provide an overflow baffle $E^2$, see Figs. 1 and 2, which projects above the bottom plate $a^2$ so that the water will necessarily flow in contact with the bottom before it can pass out of the chamber $E°$.

The water to be frozen, which is preferably filtered raw water, is supplied through the water main F, controlled by the valve $f$, which main is provided with one branch pipe F' for each freezing unit. From this branch F' the water supply pipe $f'$ opens into each freezing compartment as shown in Figs. 2 and 3. This pipe $f'$ is screwed through the washer $f^2$ to form a tight joint at the bottom of the freezing compartment, and to prevent leakage from the thaw pan.

Each water pipe F' is connected to the drain pipe $F°$, controlled by the valve $f°$, so that when the valve $f$ is closed and the valve $f°$ is open, the unfrozen water remaining either in the freezing compartments or in the pipes may be drawn off. The reason for this will be hereinafter described.

In order to agitate the water in the various compartments while it is being frozen, I provide an air supply system comprising an air main H, connected to any suitable source of compressed air supply, and from this main a branch air pipe H' is connected to each one of the freezing units, and this main air pipe H' is provided with an air jet $h'$, see Fig. 3, which opens into the water supply pipe $f'$ for supplying water to each compartment above the same.

This air jet $h'$ projects above the top of the branch pipe F', so that the air will be always directed upward through the water inlet pipe $f'$ and thus will flow up into the compartment above.

This air escapes through the upper part of the apparatus, which is not ordinarily air tight.

The refrigerating medium, preferably ammonia, is supplied to the system through the main I, from a suitable source of supply controlled by an ordinary expansion valve, not shown. This main is controlled by the valve $i$, and is provided with a branch pipe I' for each freezing unit. This branch pipe I' opens into the bottom of the first expansion chamber D, at the bottom thereof, and the refrigerant rising upward flows over the top of the baffle plate $D^2$, and then flows downward, entering the refrigerant connection pipe $I^2$ by which it is carried to the next expansion chamber, and, rising to the top of this chamber and ascending as before, the refrigerant enters the pipe $I^3$, whence it passes to the next expansion chamber and from which it escapes through the pipe $I^4$, and following the same course it passes through the pipes $I^5$, $I^6$, and is carried off by the discharge pipe $I^7$ to the suction header $I^8$, from whence it is carried to the compressor, not shown. It will be seen that the ammonia, or other refrigerant, enters the first expansion chamber through the supply pipe and rises on that side of the expansion chamber to the top of the baffle plate and downward to the exit line, and through that line into the next expansion chamber and so on throughout the entire series.

Thus it will be seen that the refrigerant passes *seriatim* through each of the expansion chambers in each of the freezing units.

Since the ammonia gas preferably used in the system carries along with it more or less entrained oils, which are apt to condense and clog up the system, I provide an oil drain system whereby the entrained oil may be accumulated and drawn off, which will now be described.

Projecting down from the refrigerant inlet pipe I' is the oil drain pipe K', into which any oil contents in said pipe I' tend to settle. Beneath the outer end of the pipe $I^2$ a similar oil drain pipe $K^2$ is provided, and similar pipes $K^3$, $K^4$, $K^5$, $K^6$ and $K^7$ are also provided beneath the corresponding pipe I' to $I^6$.

Each of these pipes is controlled by a valve $k$ which serves to prevent the passage of any refrigerant through the oil drain line, except when desired, and also permits the oil to settle freely in said oil drain pipes. When it is desired to remove the oil from the system, it is sufficient to open for a brief interval these various valves $k$, and the refrigerant will blow the oil from the drain system into the exhaust main $K^8$ controlled by the valve $k^8$.

In order to thaw the ice at the longer sides of the cakes, I provide a separate gas main L connected to the branch pipes I', whereby warm or hot gas may be supplied to the various expansion chambers, and thus the longer sides of the cakes of ice may be thawed loose from engagement with the corresponding sides of the freezing compartment. The ends of the ice cakes and the bottoms of the cakes are thawed by a water circulating system which will now be described.

M represents a main for supplying water at a suitable temperature for thawing, which is connected to the header M', from which lead the pipes $m$ and $m'$ at each side of the trough A. These pipes $m$ and $m'$ are perforated so as to spray water on the walls $a$, and $a'$ of the freezing unit. This water, after flowing along these sides, falls into the thaw pan E, its temperature being considerably lowered by contact with the cold sides of the freezing unit.

In order to provide for thawing the ice in the bottom of the compartments, I provide a pipe N for supplying correspondingly warm water to the thaw pan E, which pipe is controlled by the valve $n$. Water from this pipe N fills the chamber $E^\circ$ in the thaw pan E, and the water flowing in contact with the bottom of the various compartments will rise over the baffle plate $E^2$, and will escape through the pipe $p$, past the valve $p'$, and will be drawn off through the drain pipe P. When the thawing operation has been completed, the water remaining in the thaw pan E may be drawn off through the pipe $p^2$, controlled by the valve $p^3$.

When the process of freezing is nearly completed, the content of the various compartments is in the form of ice Q, as shown in Fig. 2, with a center of unfrozen water $q$. In order to remove the frozen cakes of ice from the several freezing compartments, I provide pulling hooks T, having prongs $t$, which are adapted to be frozen into the ice cakes, as shown in Fig. 2. These hooks are provided with supporting shoulders $t'$ and with sockets $t^2$, adapted to engage suitable dogs on the harvesting crane, not shown.

Having thus described the details of the construction of the various parts, the operation of the complete device will now be described.

The first step in the operation is to fill the various compartments with water to the desired height, then turn on the air through the air pipes $K'$ to properly agitate the water, and this agitation should be continued through the entire freezing period.

Now turn on the refrigerant from the source of supply, not shown, through the main I, and permit it to expand and to flow *seriatim* through the expansion chambers at the end of each of the compartments, the refrigerant being finally carried off through the suction main $I^8$ to the compressor not shown. The water in the compartments will begin to congeal from the sides adjacent to the expansion chambers, and as the ice thickens a core of unfrozen water will be left in the center of the compartment which will be found to contain most of the impurities of the water. The air, agitating the water, will cause the impurities to continue to flow to the center as the ice is formed from the sides of the cake, and in due course of time the bulk of the impurities that at one time were scattered through the water in the entire compartment are now concentrated in the core.

When the unfrozen core has been reduced to the desired extent, the valve $f$, controlling the admission of raw water, is closed and the valve $f^\circ$ is opened, and the water from the various cores of the unit is drawn off, as also the water remaining in the pipe system behind the unit. When all of the water has been drawn off from the cores, close the valve $f^\circ$ and re-open the valve $f$. This will permit the influx of sufficient water to fill up the air space in the center of the cakes, and this water being frozen by the continuous application of the cold gas, a solid cake of clear and pure ice will be secured.

When the cake is frozen solid, the air supply is cut off from the pipes H'.

The cakes now being frozen, in order to remove same it is first necessary to thaw them loose from the sides and bottom of the compartment. This is done by turning on the warm gas from the pipe L, and into the pipes I', $I^2$, etc., and causing it to pass through the expansion chambers, thus melting the long sides of the cake while the ends of the cake are thawed by means of the perforated pipes $m$ and $m'$, and the bottom is thawed by means of the water in the thaw pan E.

When the cakes of ice have been thawed loose from the walls and bottom of the freezing compartments, the cover having been in the meantime removed, these cakes are lifted out by means of a suitable harvester crane, well known in the art, having dogs, not shown, which engage the hooks T. As soon as the cakes are lifted and placed in the desired position these hooks may be readily detached, and the cakes may be either stored away, or cut up into desired shapes.

It will be obvious that various modifications might be made in the herein described apparatus, and in the construction, combination and arrangement of parts which could be used without departing from the spirit of my invention, and I do not mean to limit myself to details, except as described in the claims.

I claim as my invention :—

1. Apparatus for the manufacture of artificial ice, comprising a series of freezing units, each composed of a rectangular metal trough provided with a series of transversely disposed expansion chambers separating said trough into a series of freezing compartments, means for supplying ammonia under pressure to said expansion chambers and allowing it to expand therein, with means for causing the flow of the refrigerant through said expansion chambers *seriatim*, means for supplying raw water to the centers of the various freezing compartments, means for also supplying air under pressure to the centers of said compartments, and means for thawing the sides and bottoms of the completed ice cakes, substantially as described.

2. Apparatus for the manufacture of artificial ice, comprising a series of freezing units, each composed of a rectangular metal trough provided with a series of transversely disposed expansion chambers separating said trough into a series of freezing compartments, means for supplying ammonia under pressure to said expansion chambers and allowing it to expand therein, with means for causing the flow of the refrigerant through said expansion chambers *seriatim*, means for supplying raw water to the centers of the various freezing compartments, means for also supplying air under pressure to the centers of said compartments, means for drawing off the unfrozen water from the centers of the nearly completed ice cakes, and means for thawing the sides and bottoms of the completed ice cakes, substantially as described.

3. Apparatus for the manufacture of artificial ice, comprising a series of freezing units, each composed of a rectangular metal trough provided with a series of transversely disposed expansion chambers separating said trough into a series of freezing compartments, means for supplying ammonia under pressure to said expansion chambers and allowing it to expand therein, with means for causing the flow of the refrigerant through said expansion chambers *seriatim*, means for trapping and drawing off the entrained oil carried along with the refrigerant, means for supplying raw water to the centers of the various freezing compartments, means for also supplying air under pressure to the centers of said compartments, means for drawing off the unfrozen water from the centers of the nearly completed ice cakes, means for thawing the sides and bottoms of the completed ice cakes, and means for removing the ice cakes from the said compartments, substantially as described.

4. Apparatus for the manufacture of artificial ice, comprising a series of freezing units, each composed of a ractangular metal trough provided with a series of transversely disposed expansion chambers separating said trough into a series of freezing compartments, means for supplying ammonia under pressure to said expansion chambers and allowing it to expand therein, with means for causing the flow of the refrigerant through said expansion chambers *seriatim*, means for supplying raw water to the centers of the various freezing compartments, means for also supplying air under pressure to the centers of said compartments, and means for thawing the sides and bottoms of the completed ice cakes, comprising spray pipes for spraying water on the sides of said trough, a thaw pan mounted beneath said trough, means for causing water to flow through said thaw pan in contact with the bottom of said trough, and means for causing warm gas to flow through said expansion chambers, substantially as described.

5. Apparatus for the manufacture of artificial ice, comprising a series of freezing units, each composed of a rectangular metal trough provided with a series of transversely disposed expansion chambers separating said trough into a series of freezing compartments, each expansion chamber comprising a peripheral frame, a pair of plates forming with said frame a closed box, thimbles for spacing said plates apart, and rivets passing through said thimbles and countersunk in said plates, means for supplying ammonia under pressure to said expansion chambers and allowing it to expand therein, with means for causing the flow of the refrigerant through said expansion chambers *seriatim*, means for supplying raw water to the centers of the various freezing compartments, means for also supplying air under pressure to the centers of said compartments, and means for thawing the sides and bottoms of the completed ice cakes, substantially as described.

6. Apparatus for the manufacture of artificial ice, comprising a series of freezing units, each composed of a rectangular metal trough provided with a series of transversely disposed expansion chambers separating said trough into a series of freezing compartments, a wall of insulating material surrounding each group of freezing units but spaced away from the sides thereof, means for supplying ammonia under pressure to said expansion chambers and allowing it to expand therein, with means for causing the flow of the refrigerant through said expansion chambers *seriatim*, means for supplying raw water to the centers of the various freezing compartments, means for also supplying air under pressure to the centers of said compartments, and means for thawing the sides and bottoms of the completed ice cakes, comprising spray pipes located between said units, and in the space between said insulating material and the outer sides of the group of freezing units, for spraying water on the sides of said trough, a thaw pan mounted beneath said trough, means for causing water to flow through said thaw pan in contact with the bottom of said trough, and means for causing warm gas to flow through said expansion chambers, substantially as described.

7. Apparatus for the manufacture of artificial ice, comprising a series of freezing units, each composed of a rectangular metal trough provided with a series of transversely disposed expansion chambers separating said trough into a series of freezing compartments, a wall of insulating material surrounding each group of freezing units but spaced away from the sides thereof, means for supplying ammonia under pressure to said expansion chambers and allowing it to expand therein, with means for causing the flow of the refrigerant through said expansion chambers *seriatim*, means for supplying raw water to the centers of the various freezing compartments, means for also supplying air under pressure to the centers of said compartments, and means for thawing the sides and bottoms of the completed ice cakes, comprising spray pipes located between said units, and in the space between said insulating material and the outer sides of the group of freezing units for spraying water on the sides of said trough, a thaw pan mounted beneath said trough, means for causing water to flow through said thaw pan in contact with the bottom of said trough, means for causing warm gas to flow through said expansion chambers, and means for removing the ice cakes from the said compartments, substantially as described.

In testimony whereof, I affix my signature.

WILLIAM E. ARMISTEAD.